US011613198B1

(12) United States Patent
Carlseen (10) Patent No.: US 11,613,198 B1
(45) Date of Patent: Mar. 28, 2023

(54) SPACE EXPANDING CAMPER BED TRANSFORMERS AND KIT

(71) Applicant: Robert Howard Carlseen, Chula Vista, CA (US)

(72) Inventor: Robert Howard Carlseen, Chula Vista, CA (US)

( * ) Notice: Subject to any disclaimer, the term of this patent is extended or adjusted under 35 U.S.C. 154(b) by 0 days.

(21) Appl. No.: 17/810,659

(22) Filed: Jul. 5, 2022

(51) Int. Cl.
*B60P 3/39* (2006.01)
*B60N 3/00* (2006.01)

(52) U.S. Cl.
CPC .............. *B60P 3/39* (2013.01); *B60N 3/008* (2013.01)

(58) Field of Classification Search
CPC .................................. B60P 3/39; B60N 3/008
USPC ................................................ 296/26.12, 170
See application file for complete search history.

(56) References Cited

U.S. PATENT DOCUMENTS

| | | | | |
|---|---|---|---|---|
| 3,884,520 A * | 5/1975 | Peterson | ................. | B60P 3/341 296/26.02 |
| 4,199,188 A | 4/1980 | Albrecht et al. | | |
| 6,217,106 B1 * | 4/2001 | Reckner, Jr. | ............. | B60P 3/341 5/119 |
| 6,712,422 B1 * | 3/2004 | Vaillancourt | ........... | B60P 3/341 296/170 |
| 6,783,169 B1 * | 8/2004 | Marx | ....................... | B60J 7/141 296/100.09 |
| 7,527,318 B2 * | 5/2009 | Geise | ........................ | B60P 3/39 296/100.06 |
| 2003/0047958 A1 * | 3/2003 | Yarbrough | ............. | B60J 7/1621 296/100.06 |
| 2006/0158004 A1 * | 7/2006 | Harris | ..................... | B60P 3/341 296/176 |
| 2013/0140848 A1 * | 6/2013 | Shanley | .................... | B60P 3/34 296/172 |
| 2020/0114802 A1 * | 4/2020 | Laguana | .................. | B60P 3/39 |
| 2021/0293047 A1 * | 9/2021 | Frederickson | .......... | B60P 3/341 |

FOREIGN PATENT DOCUMENTS

CA        2664295 A1      4/2008

* cited by examiner

*Primary Examiner* — Jason S Morrow
(74) *Attorney, Agent, or Firm* — Carson Patents®; Gregory D Carson, Patent Attorney (57) ABSTRACT

The space expanding camper bed transformers and kit of the present invention are a safe and secure means to convert a short bed of a short bed pickup truck into a fully operational recreational vehicle when installed under a camper shell. The wider version of bed transformers has a bi-folding tray for supporting a mattress that is folded out of the way such that half of the sleep area is open for the installation and use of a combination toilet and shower unit at all times. The narrower, regular ned transformer apparatus is long and narrow expanding to triple the surface area and is placed over a refrigerator and stove units. The camper kit is one of each type of bed transformer combined with a bathroom, refrigerator, and stove under a camper shell with openable sides to create short bed truck recreational vehicle.

14 Claims, 5 Drawing Sheets

SPACE EXPANDING CAMPER BED TRANSFORMERS AND KIT

BACKGROUND OF THE INVENTION

Technical Field

This invention relates generally to a space expanding camper bed transformers in the form of an expanding slide out beds for the purpose of creating a camper in the bed of a short bed pickup truck under a camper shell enabling a recreational vehicle conversion of a short bed truck having two beds available while always having a bathroom (toilet and shower combination) available in any configuration.

This invention relates generally to a space expanding camper bed transformers in the form of a pair of expanding slide out beds for the purpose of creating a camper transformation kit to be installed in the bed of a short bed pickup truck under a camper shell enabling a recreational vehicle conversion of a short bed truck having two beds available while always having a bathroom available in any configuration.

Background Art

Among the prior art are a variety of camping and recreational vehicle devices that can be added to and/or installed in the small amount of space available in the bed of a short bed truck. There are camper shells and tent like devices and apparatuses that can be installed and/or inserted into the bed area of a short bed truck.

Due to the minimal area available in the short bed area of a short bed truck there are no devices, systems, or apparatuses that can make two beds available for use while at all times making an installed combination bathroom unit available for use. There are no available camping or recreational vehicles solutions that offer a plurality of beds and always available use of an installed toilet-shower combination, or a toilet-sink-shower combination in the minimal area available in the short bed of a short bed pick up truck.

In light of the foregoing prior art, there is a need for a space expanding camper bed transformer that can be installed around a toilet-shower combination, or a toilet-sink-shower combination in the minimal area available in the short bed of a short bed pick up truck to better enable the use of a short bed pickup truck as a recreational vehicle having the conveniences (bathroom, kitchen, and storage) available for use by users at all times.

BRIEF SUMMARY OF THE INVENTION

According to a first aspect of the invention, there is a bed transformer apparatus for a slide out bed comprising a bed frame having a left side opposing a right side, a first collapsible extension device operationally attached to said left side, a second collapsible extension device operationally attached to said right side, a center support device comprising an extending rail having a bed support rail contained therein positioned at a midpoint between said left side and said right side, a first support rail having at least one anchor plate connectively attached wherein said first support rail is connectively attached lengthwise to said first collapsible extension device enabling extension of said bed frame, a first support frame comprising at least one vertical support member connectively attached at a right angle to at least one horizontal support member wherein said first support frame is connectively attached lengthwise to said second collapsible extension device enabling extension of said bed frame, and a widthwise bi-folding bed tray comprising a bottom tray platform and a top tray platform unfold-able to fill said bed frame.

According to the first aspect of the invention, there is a bed transformer apparatus for a slide out bed comprising a bed frame wherein said first support frame is disconnected from said second collapsible extension device and positioned to support said midpoint and said bed transformer further comprises a second support rail having at least one anchor plate connectively attached wherein said second support rail is positioned under said bed frame along said right side connectively attached to and providing support for said second collapsible extension device enabling extension of said bed frame.

According to the first aspect of the invention, there is a bed transformer apparatus for a slide out bed comprising a bed frame further comprising a third support rail having at least one anchor plate connectively attached wherein said third support rail is positioned under said bed frame between said left side and said right side providing support for said center support device.

According to the first aspect of the invention, there is a bed transformer apparatus for a slide out bed comprising a bed frame further comprising a second support frame comprising at least one vertical support member connectively attached at a right angle to at least one horizontal support member wherein said second support frame is connectively attached lengthwise to said center support device enabling extension of said bed frame.

According to the first aspect of the invention, there is a bed transformer apparatus for a slide out bed comprising a bed frame wherein said first collapsible extension device and said second collapsible extension device are both a length at least capable of a length doubling when extended.

According to the first aspect of the invention, there is a bed transformer apparatus for a slide out bed comprising a bed frame wherein said first collapsible extension device and said second collapsible extension device are both a length at least capable of length tripling when extended.

According to the first aspect of the invention, there is a bed transformer apparatus for a slide out bed comprising a bed frame wherein said bottom tray platform further comprises a first tri-folding tray and said top tray platform further comprises a second tri-folding tray.

According to the first aspect of the invention, there is a bed transformer apparatus for a slide out bed comprising a bed frame further comprising a mattress.

According a second aspect of the invention, there is a bed transformer apparatus for a slide out bed comprising bed transformer apparatus for a slide out bed comprising a bed frame having a left side opposing a right side, a first collapsible extension device operationally attached to said left side, a second collapsible extension device operationally attached to said right side, a center support device comprising an extending rail having a bed support rail contained therein positioned at a midpoint between said left side and said right side, a first support rail having at least one anchor plate connectively attached wherein said first support rail is connectively attached lengthwise to said first collapsible extension device enabling extension of said bed frame, a first support frame comprising at least one vertical support member connectively attached at a right angle to at least one horizontal support member wherein said first support frame is connectively attached lengthwise to said second collapsible extension device enabling extension of said bed frame, and a lengthwise tri-folding bed tray comprising a bottom tray platform. A middle tray platform, and a top tray platform unfold-able to fill said bed frame.

According to the second aspect of the invention, there is a bed transformer apparatus for a slide out bed comprising a bed frame wherein said first support frame is disconnected from said second collapsible extension device and positioned to support said midpoint and said bed transformer further comprises a second support rail having at least one anchor plate connectively attached wherein said second support rail is positioned under said bed frame along said right side connectively attached to and providing support for said second collapsible extension device enabling extension of said bed frame.

According to the second aspect of the invention, there is a bed transformer apparatus for a slide out bed comprising a bed frame further comprising a third support rail having at least one anchor plate connectively attached wherein said third support rail is positioned under said bed frame between said left side and said right side providing support for said center support device.

According to the second aspect of the invention, there is a bed transformer apparatus for a slide out bed comprising a bed frame further comprising a second support frame comprising at least one vertical support member connectively attached at a right angle to at least one horizontal support member wherein said second support frame is connectively attached lengthwise to said center support device enabling extension of said bed frame.

According to the second aspect of the invention, there is a bed transformer apparatus for a slide out bed comprising a bed frame wherein said first collapsible extension device and said second collapsible extension device are both a length at least capable of length tripling when extended.

According to the second aspect of the invention, there is a bed transformer apparatus for a slide out bed comprising a bed frame further comprising a mattress.

According a third aspect of the invention, there is a truck bed camper kit to enable an always available bathroom comprising a camper shell, a first bed transformer device having a widthwise bi-folding bed tray for a wide bed, and a recreational vehicle toilet-sink-shower bathroom combination apparatus positioned underneath said first bed transformer device.

According to the third aspect of the invention, there is a truck bed camper kit comprising a second bed transformer device having a lengthwise tri-folding bed tray for a regular bed.

According to the third aspect of the invention, there is a truck bed camper kit comprising a collapsible bathroom surround positioned around said toilet-sink-shower bathroom combination apparatus and extendable upwardly to enclose said toilet-sink-shower bathroom combination apparatus.

According to the third aspect of the invention, there is a truck bed camper kit comprising a recreational vehicle refrigerator.

According to the third aspect of the invention, there is a truck bed camper kit comprising a recreational vehicle kitchen apparatus.

An advantage of the space expanding camper bed transformers is that two beds can be added into the minimal space of a short bed in a short bed pickup truck that enable the conversion of a short bed pickup truck into a recreational vehicle.

An advantage of the space expanding camper bed transformers is that two beds can be added into the minimal space of a short bed in a short bed pickup truck that enable the conversion of a short bed pickup truck into a recreational vehicle that has a combination toilet and shower bathroom unit available for use at all times.

The invention will now be described, by way of example only, with reference to the accompanying drawings in which:

Figure 1:
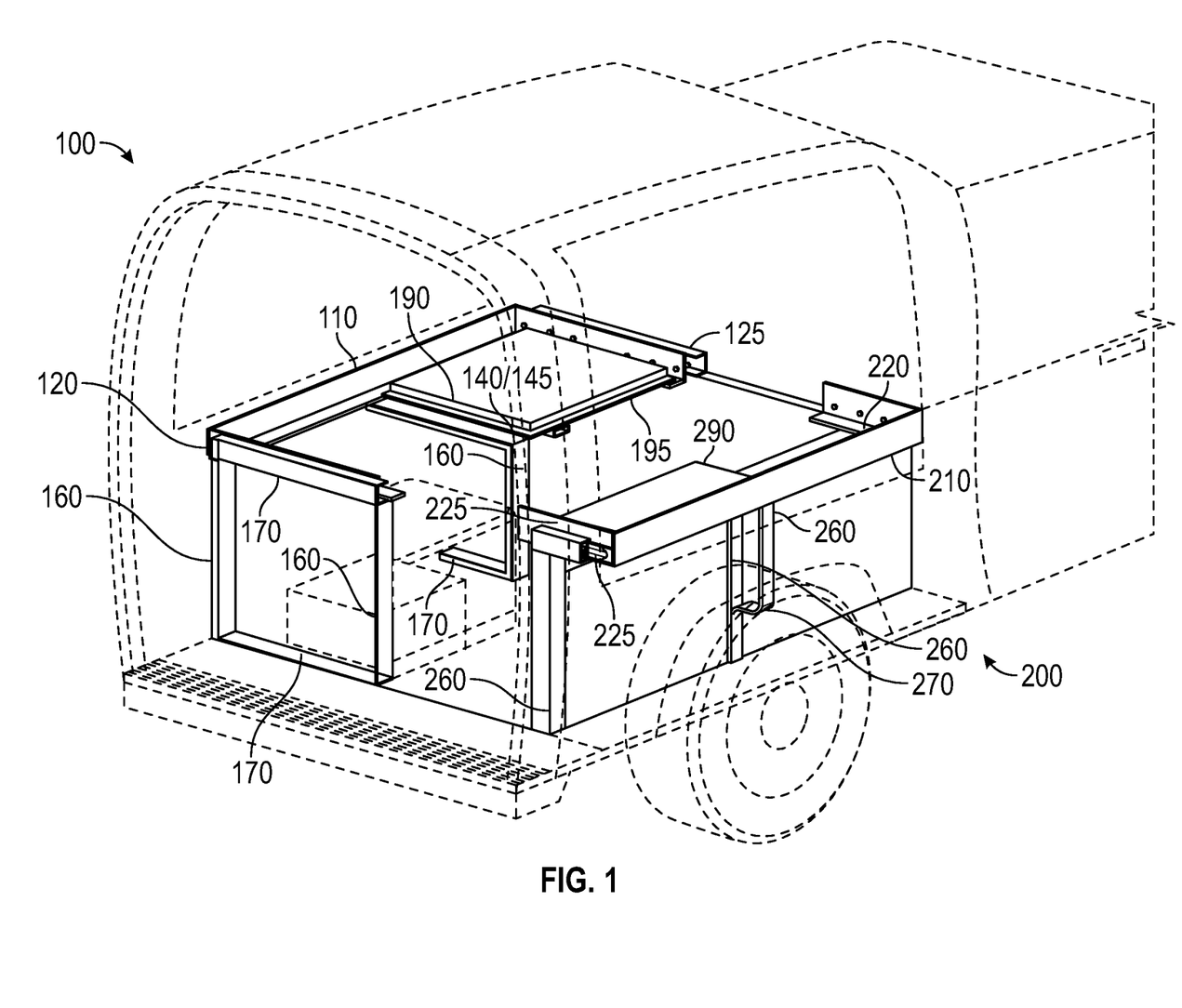
FIG. 1 shows a perspective view of the wide bed transformer apparatus and the regular bed transformer apparatus shown closed with the respective bed tray or platform folded in a broken line environment of the bed end of a pickup truck having a camper shell attached thereto according to the invention.
Figure 2:
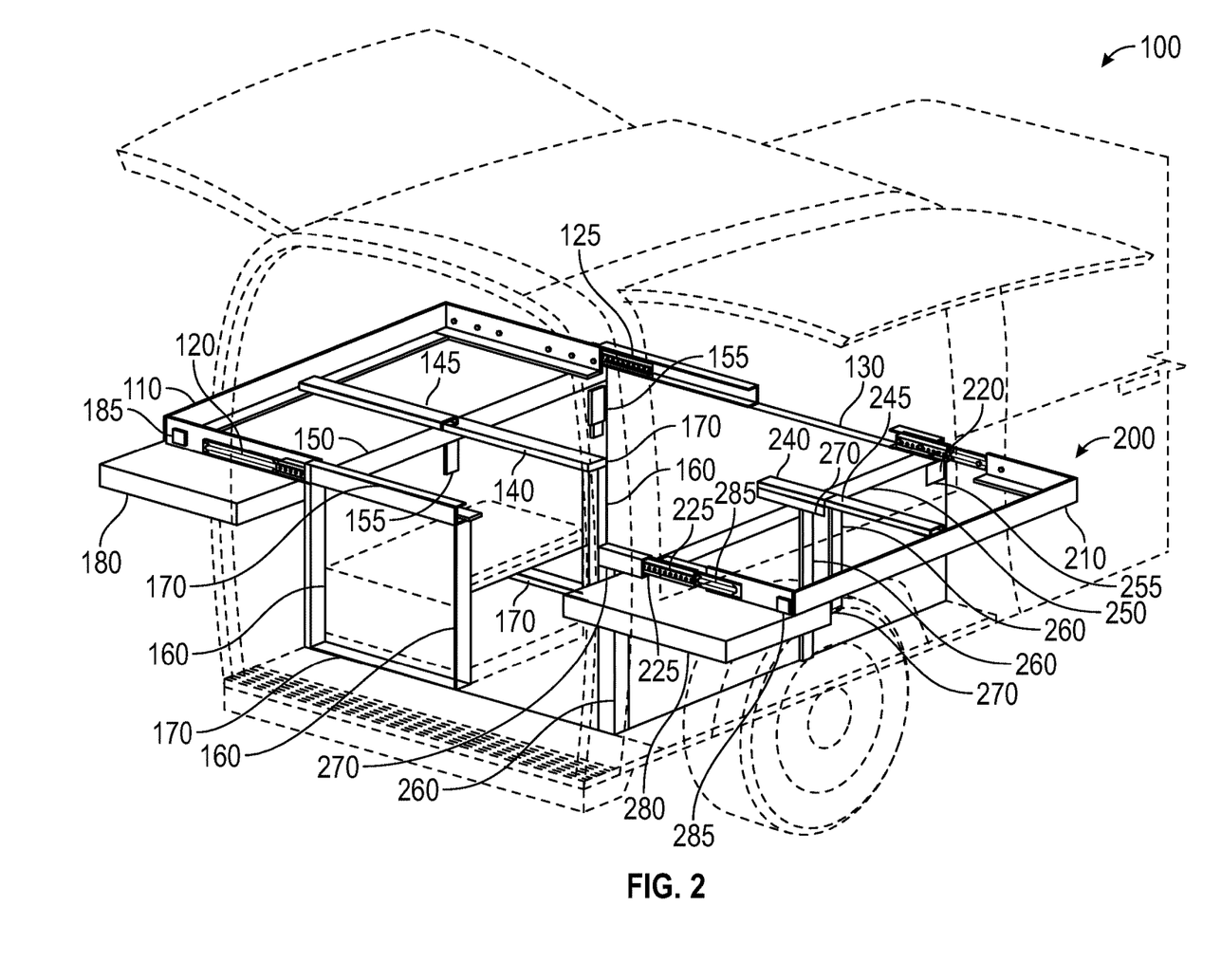
FIG. 2 shows a perspective view of the wide bed transformer apparatus and the regular bed transformer apparatus shown open (extended) in a broken line environment of the bed end of a pickup truck having a camper shell attached thereto according to the invention.
Figure 3:
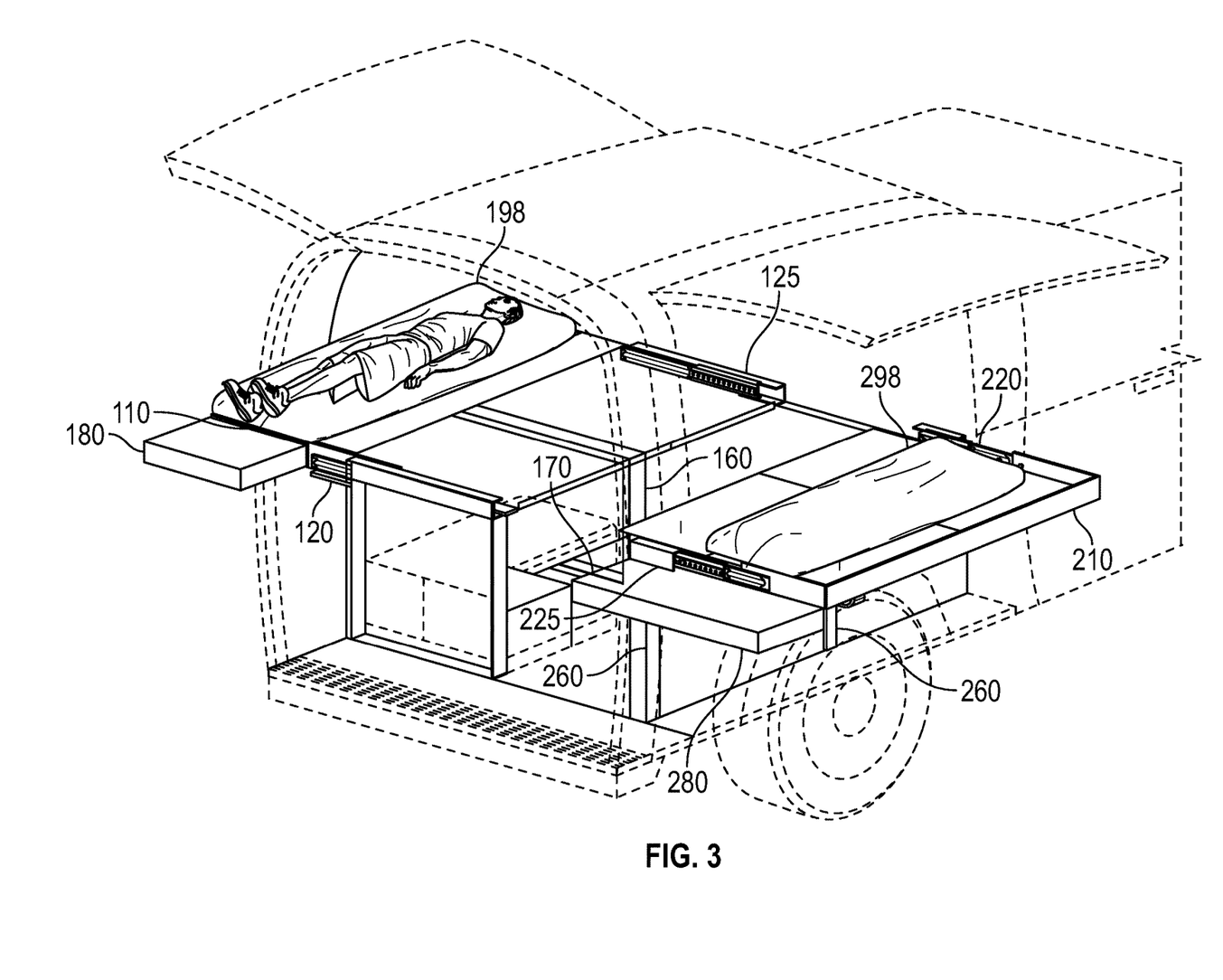
FIG. 3 shows a perspective view of the wide bed transformer apparatus and the regular bed transformer apparatus shown extended (open) with the respective bed tray or platform un-folded (opened and in place above the bed tray) having a mattress on top in a broken line environment of the bed end of a pickup truck having a camper shell attached thereto according to the invention.
Figure 4:
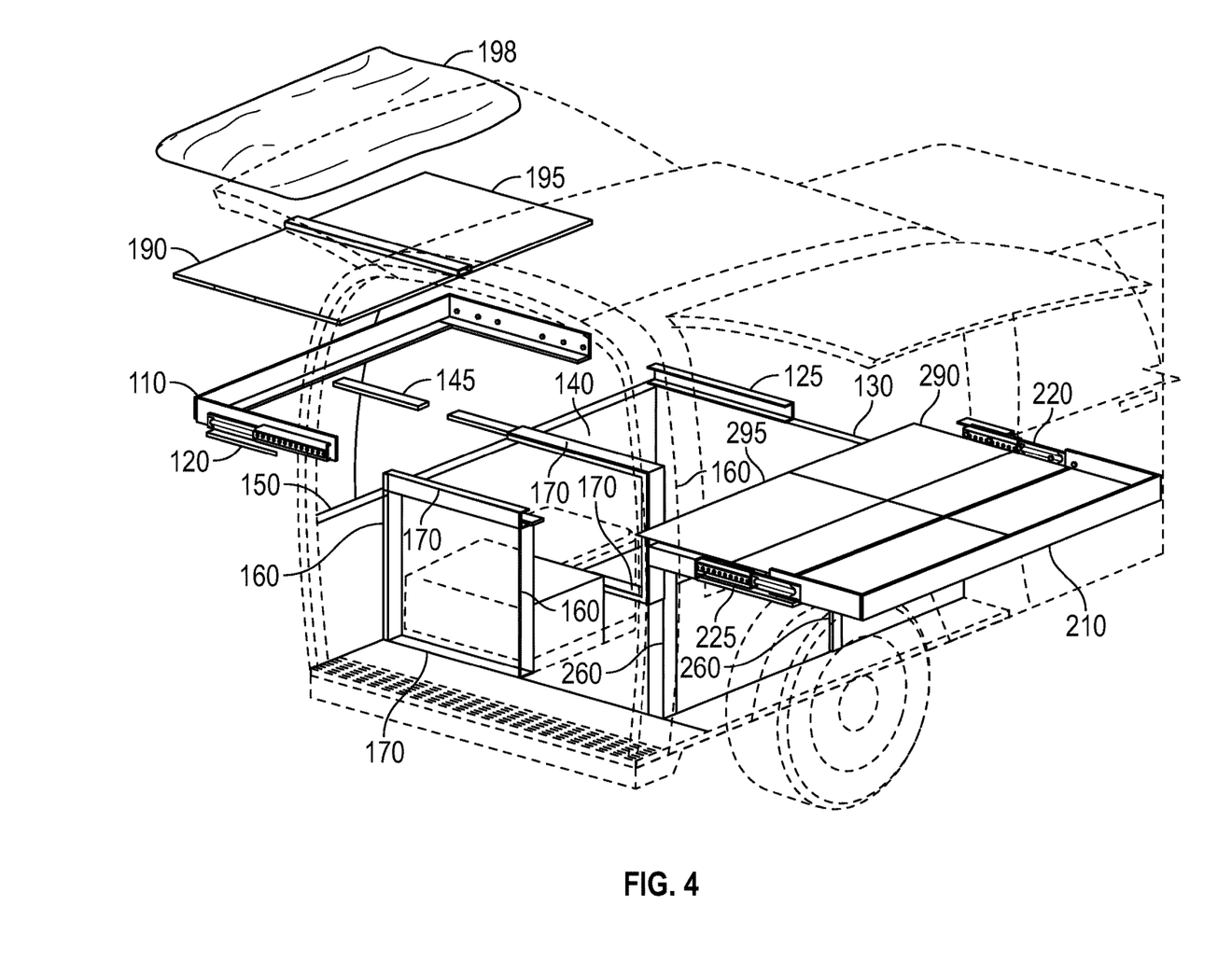
FIG. 4 shows a perspective view of the wide bed transformer apparatus shown shown with its elements in an exploded view and the regular bed transformer apparatus shown open (extended) with the respective bed tray or platform un-folded (opened and in place above the bed tray) in a broken line environment of the bed end of a pickup truck having a camper shell attached thereto according to the invention.
Figure 5:
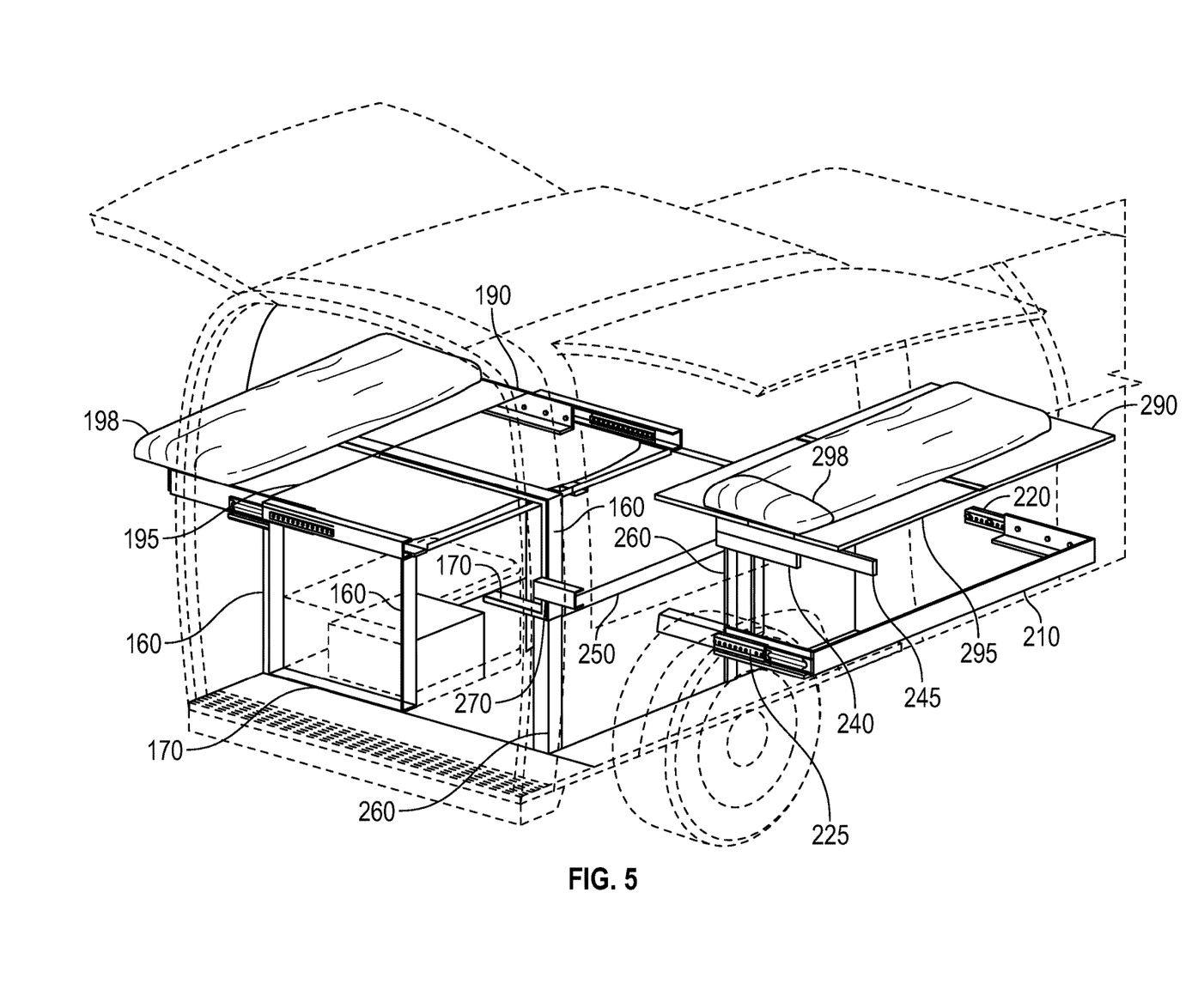
FIG. 5 shows a perspective view of the wide bed transformer apparatus shown open (extended) and the regular bed transformer apparatus shown with its elements in an exploded view with the respective bed tray or platform un-folded (opened and in place above the bed tray) in a broken line environment of the bed end of a pickup truck having a camper shell attached thereto according to the invention.

The broken lines in the figures represent a camper shell and pickup truck having a truck bed where in the apparatus of the present invention is installed for use by at least one user.

DETAILED DESCRIPTION

The detailed embodiments of the present invention are disclosed herein. The disclosed embodiments are merely exemplary of the invention, which may be embodied in various forms. The details disclosed herein are not to be interpreted as limiting, but merely as the basis for the claims and as a basis for teaching one skilled in the art how to make and use the invention.

References in the specification to "one embodiment," "an embodiment," "an example embodiment," etcetera, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Throughout this specification, the word "comprise", or variations thereof such as "comprises" or "comprising", will be understood to imply the inclusion of a stated element, integer or step, or group of elements integers or steps, but not the exclusion of any other element, integer or step, or group of elements, integers or steps.

Index of labelled features in figures. Features are listed in numeric order. Referring to the Figures, there is shown in FIGS. 1, 2, 3, 4, and 5 the following features:

Element 100 which is a wide bed transformer apparatus.
Element 110 which is a wide bed frame.
Element 120 which is a left side wide frame collapsible extension device.
Element 125 which is a right side wide frame collapsible extension device.
Element 130 which is a support rail for attachment to a shell or vehicle body.
Element 140 which is a wide bed support extending rail.
Element 145 which is a wide bed support rail.
Element 150 which is a support rail for attachment to a shell or vehicle body.
Element 155 which is a support rail anchor plate.
Element 160 which is a vertical support member.
Element 170 which is a horizontal support member.
Element 180 which is a wide bed expansion tray.
Element 185 which is an expansion tray support connector.
Element 190 which is a wide bed tray bottom platform (bi-folded platform).
Element 195 which is a wide bed tray top platform (bi-folded platform).
Element 198 which is a wide bed mattress.
Element 200 which is a regular bed transformer apparatus.
Element 210 which is a regular bed frame.
Element 220 which is a left side regular frame collapsible extension device.
Element 225 which is a right side regular frame collapsible extension device.
Element 240 which is a regular bed support extending rail.
Element 245 which is a regular bed support rail.
Element 250 which is a support rail for attachment to a shell or vehicle body.
Element 255 which is a support rail anchor plate.
Element 260 which is a vertical support member.
Element 270 which is a horizontal support member.
Element 280 which is a regular bed expansion tray.
Element 285 which is an expansion tray support connector.
Element 290 which is a regular bed tray bottom trifold platform.
Element 295 which is a regular bed tray top trifold platform.
Element 298 which is a regular bed mattress.

In a first embodiment of the manufacturing method a wide width space expanding camper bed transformer is attached to and operationally installed into the short bed of a short bed pickup truck under a camper shell and positioned around a toilet/shower bathroom combination unit such that when the extending bed is closed and when it extends out the side of the camper shell to make a bed available a toilet/shower bathroom combination is always available for use. The toilet/shower bathroom combination may be any existing or future single unit or combination of devices that enable a fully functional bathroom, in particular for recreational vehicle use. The bathroom is fully enclosed with a set of collapsible walls, sliding walls, sliding partitions, and/or fabric screens, walls, or partitions for privacy.

In a second embodiment of the manufacturing method the single bed recreational vehicle conversion for a short bed pickup truck of the first embodiment is then expanded to include a second regular width space expanding camper bed transformer that is long and narrow positioned over a kitchen and stove devices.

In a third embodiment of the manufacturing method there is a short bed pickup truck is converted to a fully functional recreational vehicle with a camper shell, a fully enclosed bathroom facility, accessible at all times, and including up to two extendable beds, a kitchen, refrigerator, and storage areas. The preferred configuration is the installation on the driver's side of a slide out bed (transformer bed 100) with a bi-folding base tray 190, 195 that when closed covers only the front half (closer to the cabin) of the driver's side of the bed of a pickup truck which is installed at truck bed wall height around a fully functional bathroom with walls surrounding it on the rear half of the driver's side of the truck bed, thus making storage space and/or space for a refrigerator available under the bed tray section of the collapsed slide out bed. Further, a second slide out bed 200 having a tri-folding bed base tray 290, 295 is installed situated over a refrigerator unit and/or kitchen unit located underneath on the passengers side of the truck bed area. Any refrigerator unit and or kitchen unit suited for recreational vehicle use is suitable for use in the present invention provided it fits in the narrow space underneath the second slide out bed.

In order to provide space for a full bath module or permanent bath enclosure, the slide out transformer bed provides for an articulating slide out bed platform which transforms to a full length bed when the slide out mechanism is fully employed/extended. The system/device/apparatus of the present invention features a most unique system which works around the bath (bathroom) area allowing the bathroom (toilet, shower, and/or sink) to be utilized at all times and under any of the multiple sleeping location options.

The mechanism is divided into two main sections, both utilizing a slide-out high strength aluminum frame capable of supporting the weight required for up to a large person. The forward (closer to the driving cabin of the truck) approximate half portion, maintains a fixed platform comprised of a folded sleeping surface. This platform surface is removable, however normally meant to remain in place and slides over the refrigerator and storage area located in the forward left section (driver's side) of the truck bed under an installed camper shell. The rearward bed platform extension frame is stored on top of the truck bed wall frame and is allowed to be relocated rearward and secured via hook and loop fasteners. The rearward approximately half portion of the slide out bed frame 110, 210, maintains only a skeleton frame sliding out when employed and does not interfere with the operation or use of an installed bathroom within the open rearward section.

The driver's side slide out transfers bed, once fully deployed (extended into bed use position) with both halves of the platform available, has a sleeping area that is approximately 1.6764 meters (5½ feet) long when installed in a short bed truck sized camper shell installed in/on/over a short bed truck bed with a short bed truck bed length. To provide additional length for the left side (driver's side) transformer bed an extension tray can be attached providing approximately an additional 33.02 centimeters (13 inches) of bed length, making the slide out bed approximately 2.0 meters (6½ feet) long.

When using a camper shell with canvas side walls for expansion and/or extension a lightweight safety shield is to be unfolded and secured into place around the outside perimeter, between the mechanical frame and the platforms. Next the canvas or panel walls are deployed around the sides of the slide out bed. The canvas sides are typically secured in place within the recessed section of the left side door in the canvas net holder with the top seam already secured in place on the raised side door. The canvas wall is secured under an aluminum frame mechanism with a hook and loop holder.

If employing any optional lightweight panel side walls, unfold and secure the ridged side walls into place with the lower portion mating via hook and look closures between the aluminum frame mechanism and the platforms. The upper edge being secured to the above opened side door via hook and loop closure.

The bi-folding slide out transformer bed, when fully extended extends outwardly from the side of the camper shell approximately 71.12 centimeters (28 inches), providing approximately 76.2 centimeters (30 inches) of sleeping platform when extended.

The bathroom can be fully accessed when slide out bed is moved (extended) outside the camper shell. This is unlike a narrow tri-fold slide out transformer bed, which can function as a narrower sleeping platform without being employed outside of the camper shell while not affecting access and use of the fully enclosed bathroom. The driver's side slide out bed could possibly be utilized as a sleeping platform without being employed outside of the camper shell, however it would cover the mid and upper section of the bath, thus not allowing it to be functionally accessed.

To maintain an always open walkway between a wide bi-folding bed tray slide out bed surrounding a toilet/shower bathroom combination the first (wider) expanding bed is installed surrounding the bathroom so as to keep it always available for use and a second bed implementing a passenger side (right side) slide out bed with a bi-folding bed tray having two tri-folding trays un-foldable to fill a fully extended bed tray position is implemented on the opposite side of the short bed area under an installed camper shell.

In order to minimize the amount of interior space required for interior movement and use when having a right side/passenger side slide out bed, the tri-folding bed tray bed transformer apparatus of the present invention was developed. The apparatus of the present invention requires only 30.48-31.75 centimeters (12-12½ inches) of linear space or width space. The linear space or width space is calculated (measured) from the inside of the right side door of camper shell installed on the truck bed of a pickup truck. This long narrow tri-folding bed that extends/expands/transforms to triple its stowed width allows more interior space, even when the passenger side bed is being employed. The bathroom, refrigerator, kitchen facilities, and storage locations are still easily accessible.

In one example, there is a camper shell enclosure for sliding into a truck bed where there is an approximately 36.83 centimeters (14½ inches) wide Fixed Base Counter (FBC), which runs the length of the length of the camper shell on the passenger side to the left inside the passenger side door, of which only 31.75 centimeters (12½ inches) or less inches protrude into the camper interior. Of this width, 6.35-7.62 centimeters (2½-3 inches) are positioned under the side panel/door. Above the FBC, is where a sliding platform mechanism for the passenger side bed transformer is installed which combines a lengthwise folding bed platform consisting of two approximately 30.48 centimeter (12 inch) wide Sliding Bed Platform (SBP), hinging apart and extending over and further outside of the FBC when extended. The SBP provides approximately 76.2 centimeters (30 inches) of sleeping bed width when opened and extended.

An additional pair of Flip-Up Extensions (FEU) to the FBC can be employed. The width can be adopted to widths ranging from 12.7-35.56 centimeters (5-14 inches), providing that amount of increased width to this bed. In a preferred embodiment, there is an 27.94 centimeters (11 inches) extension which allows 33.02 centimeters (13 inches) of remaining space between the bathroom and refrigerator/freezer area and the passenger side bed. Also the forward extension is chamfered from 27.94 centimeters (11 inches) to 12.7 centimeters (5 inches) to allow more entry room. A height spacer is employed on the FBC (and side extensions if employed), to level the surfaces with the SBP's.

In an embodiment, the side door or opening of a camper shell is opened upward powered and secured by gas struts, and the slide lock is released. The passenger side slide out bed transformer frame is pulled out to it's full extension and auto-locked into place. The top platform is lifted and hinged upward and inward directly resting near the outward edge on the fixed position base-counter. A lightweight spacer is secured in place on the remaining exposed fixed position base-counter to bring all three surfaces to the same level of height for the sleeping mattress 198, 298.

In an embodiment, a polycarbonate safety wall is slid and secured into place around the outside perimeter of the exterior area of the bed slide. Further, an insulated canvas exterior side wall is released from with the door compartment above (where it is installed and stowed when not in use) and secured into place via hook and loop fasteners on the underside of the slide frame.

In an embodiment, an optional Flip-up Bed Extension (FBE), to make the functional surface of the bed longer for taller users, is attached to the inward length of the base of the fixed position base-counter and can utilized if desired, providing additional bed length. The FBE is secured in place via four folding shelf brackets in the normal space between the fixed position base-counter and the bathroom/refrigerator is 60.96-66.04 centimeters (24-26 inches). The FBE is normally recommended to be 25.4-30.48 centimeters (10-12 inches) wide, to allow a minimum of 35.56 centimeters (14 inches) of remaining pass through space between the bathroom and refrigerator/freezer area and the passenger side bed with the temporary extension up and in place when sleeping.

Enclosed bath/bathroom options include a fully enclosed bathroom facility, accessible at all times, even when any of the multiple sleeping locations are in use, or if the shell (truck bed camper) is entered while travel. Such as a full hot and cold water sit down shower, wherein the toilet is the sit down surface in a full or partial enclosure option. Either enclosure option employs removable mid level-center panels approximately 55.88 centimeters (22 inches) above the floor).

Enclosed bath/bathroom options include a removable bath module (for fully or partially enclosed use) with a floor pan and removable portable cassette toilet, and having a removable mid-level enclosure walls and door.

Enclosed bath/bathroom options include a permanent bathroom setup with built in cassette toilet, a floor pan, permanent or removable mid-level enclosure walls and door. Thus provides a full or partially enclosed preference option, yields a greater field of vision while driving, and the ability to load wide items such sheets of plywood in the back of the truck even with the truck converted to recreational vehicle use as herein described.

In a preferred embodiment of the present invention, there is a bed transformer apparatus 100, 200 for a slide out bed comprising a bed frame 110, 210 having a left side opposing a right side, a first collapsible extension device 120, 220 operationally attached to said left side, a second collapsible extension device 125, 225 operationally attached to said right side, a center support device comprising an extending rail 140, 240 having a bed support rail 145, 245 contained therein positioned at a midpoint between said left side and said right side, a first support rail 150, 250 having at least one anchor plate 155, 255 connectively attached wherein said first support rail 150, 250 is connectively attached lengthwise to said first collapsible extension device 120, 220 enabling extension of said bed frame 110, 210, a first support frame comprising at least one vertical support member 160, 260 connectively attached at a right angle to at least one horizontal support member 170, 270 wherein said first support frame is connectively attached lengthwise to said second collapsible extension device 125, 225 enabling extension of said bed frame 110, 210, and a widthwise bi-folding bed tray comprising a bottom tray platform 190 and a top tray platform 195 unfold-able to fill said bed frame 110, 210. Heavy weight, high strength materials can provide a supportable weight more than 150 kilograms.

In an alternate embodiment of the present invention, there is a camping bed transformer apparatus 100, 200 wherein said first support frame is disconnected from said second collapsible extension device 125, 225 and positioned to support said midpoint and said bed transformer further comprises a second support rail having at least one anchor plate 155, 255 connectively attached wherein said second support rail is positioned under said bed frame 110, 210 along said right side connectively attached to and providing support for said second collapsible extension device 125, 225 enabling extension of said bed frame 110, 210.

In an alternate embodiment of the present invention, there is a camping bed transformer apparatus 100, 200 further comprising a third support rail 150, 250 having at least one anchor plate 155, 255 connectively attached wherein said third support rail 150, 250 is positioned under said bed frame 110, 210 between said left side and said right side providing support for said center support device.

In an alternate embodiment of the present invention, there is a camping bed transformer apparatus 100, 200 further comprising a second support frame comprising at least one vertical support member 160, 260 connectively attached at a right angle to at least one horizontal support member 170, 270 wherein said second support frame is connectively attached lengthwise to said center support device enabling extension of said bed frame 110, 210.

In an alternate embodiment of the present invention, there is a camping bed transformer apparatus 100, 200 wherein said first collapsible extension device 120, 220 and said second collapsible extension device 125, 225 are both a length at least capable of a length doubling when extended.

In an alternate embodiment of the present invention, there is a camping bed transformer apparatus 100, 200 wherein said first collapsible extension device 120, 220 and said second collapsible extension device 125, 225 are both a length at least capable of length tripling when extended.

In an alternate embodiment of the present invention, there is a camping bed transformer apparatus 100, 200 wherein said bottom tray platform further comprises a first tri-folding tray and said top tray platform further comprises a second tri-folding tray.

In an alternate embodiment of the present invention, there is a camping bed transformer apparatus 100, 200 further comprising a mattress 198, 298.

In a preferred embodiment of the present invention, there is a bed transformer apparatus 100, 200 for a slide out bed comprising a bed frame 110, 210 having a left side opposing a right side, a first collapsible extension device 120, 220 operationally attached to said left side, a second collapsible extension device 125, 225 operationally attached to said right side, a center support device comprising an extending rail 140, 240 having a bed support rail 145, 245 contained therein positioned at a midpoint between said left side and said right side, a first support rail having at least one anchor plate 155, 255 connectively attached wherein said first support rail is connectively attached lengthwise to said first collapsible extension device 120, 220 enabling extension of said bed frame 110, 210, a first support frame comprising at least one vertical support member 160, 260 connectively attached at a right angle to at least one horizontal support member 170, 270 wherein said first support frame is connectively attached lengthwise to said second collapsible extension device 125, 225 enabling extension of said bed frame 110, 210, and a lengthwise tri-folding bed tray comprising a bottom tray platform. A middle tray platform, and a top tray platform unfold-able to fill said bed frame 110, 210.

In an alternate embodiment of the present invention, there is a camping bed transformer apparatus 100, 200 wherein said first support frame is disconnected from said second collapsible extension device 125, 225 and positioned to support said midpoint and said bed transformer further comprises a second support rail having at least one anchor plate 155, 255 connectively attached wherein said second support rail is positioned under said bed frame 110, 210 along said right side connectively attached to and providing support for said second collapsible extension device 125, 225 enabling extension of said bed frame 110, 210.

In an alternate embodiment of the present invention, there is a camping bed transformer apparatus 100, 200 further comprising a third support rail having at least one anchor plate 155, 255 connectively attached wherein said third support rail is positioned under said bed frame 110, 210 between said left side and said right side providing support for said center support device In an alternate embodiment of the present invention, there is a camping bed transformer apparatus 100, 200 further comprising a second support frame comprising at least one vertical support member 160, 260 connectively attached at a right angle to at least one horizontal support member 170, 270 wherein said second support frame is connectively attached lengthwise to said center support device enabling extension of said bed frame 110, 210.

In an alternate embodiment of the present invention, there is a camping bed transformer apparatus 100, 200 wherein said first collapsible extension device 120, 220 and said second collapsible extension device 125, 225 are both a length at least capable of length tripling when extended.

In an alternate embodiment of the present invention, there is a camping bed transformer apparatus 100, 200 further comprising a mattress 198, 298.

In a preferred embodiment of the present invention, there is a truck bed camper kit to enable an always available bathroom comprising a camper shell, a first bed transformer device having a widthwise bi-folding bed tray for a wide bed, and a recreational vehicle toilet-sink-shower bathroom combination apparatus positioned underneath said first bed transformer device. The widthwise folding extending bed is only covered by its mattress tray over half of the area due to the folded bed tray, thus making the recreational vehicle toilet-sink-shower bathroom combination apparatus available for use at all times.

In an alternate embodiment of the present invention, there is a truck bed camper kit comprising a second bed transformer device having a lengthwise tri-folding bed tray for a regular bed. The tri-folding sections can be any suitable triple extending arms capable of safely holding the weight of a person while extended, or a combination of two or more double extending arms capable of safely holding the weight of a person while extended.

In an alternate embodiment of the present invention, there is a truck bed camper kit comprising a collapsible bathroom surround positioned around said toilet-sink-shower bathroom combination apparatus and extendable upwardly to enclose said toilet-sink-shower bathroom combination apparatus. This toilet-sink-shower bathroom combination apparatus can be any of the available units on the market today that is dimensioned to fit within the space available in a short bed of a short bed pick truck under a camper shell. Units that are long and narrow, having the same depth dimension as the space available are best.

In an alternate embodiment of the present invention, there is a truck bed camper kit comprising a recreational vehicle refrigerator. This recreational vehicle refrigerator can be any of the available units on the market today that is dimensioned to fit within the space available in a short bed of a short bed pick truck under a camper shell. Units that are long and narrow, having the same depth dimension as the space available are best.

In an alternate embodiment of the present invention, there is a truck bed camper kit comprising a recreational vehicle kitchen apparatus. This kitchen apparatus can be any of the available units on the market today that is dimensioned to fit within the space available in a short bed of a short bed pick truck under a camper shell. Units that are long and narrow, having the same depth dimension as the space available are best.

An advantage of the space expanding camper bed transformers is that two beds can be added into the minimal space of a short bed in a short bed pickup truck that whether extended or collapsed enable the conversion of a short bed pickup truck into a recreational vehicle that has a combination toilet and shower bathroom unit available for use at all times.

An advantage of the present invention is the feature is provides and certain key benefits to include, but not be limited to the following:

Very fast set-up to accommodate sleeping, typically while on the road for a short sleeping stop;

Completely secured interior sleeping option for added security with all doors and panels closed and locked on the camper shell, the truck bed camper kit is a fully secured hard-shell capsule; and Security features can include synchronization with most automatic locking, security, and, alarm systems, and may have additional surrounding environment security features outside the vehicle depending on the configuration and equipment of the vehicle.

For extreme weather conditions, it also provides for a more weather tight and temperature controlled environment when combined with the any of the HVAC systems options available.

The invention has been described by way of examples only. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the claims.

Although the invention has been explained in relation to various embodiments, it is to be understood that many other possible modifications and variations can be made without departing from the spirit and scope of the invention.

The invention claimed is:

1. A bed transformer apparatus for a slide out bed comprising a bed frame having a left side opposing a right side, a first collapsible extension device operationally attached to said left side, a second collapsible extension device operationally attached to said right side, a center support device comprising an extending rail having a bed support rail contained therein positioned at a midpoint between said left side and said right side, a first support rail having at least one anchor plate connectively attached wherein said first support rail is connectively attached lengthwise to said first collapsible extension device enabling extension of said bed frame, a first support frame comprising at least one vertical support member connectively attached at a right angle to at least one horizontal support member wherein said first support frame is connectively attached lengthwise to said second collapsible extension device enabling extension of said bed frame, and a widthwise bi-folding bed tray comprising a bottom tray platform and a top tray platform unfold-able to fill said bed frame.

2. The bed transformer apparatus of claim further 1 wherein said first support frame is disconnected from said second collapsible extension device and positioned to support said midpoint and said bed transformer further comprises a second support rail having at least one anchor plate connectively attached wherein said second support rail is positioned under said bed frame along said right side connectively attached to and providing support for said second collapsible extension device enabling extension of said bed frame.

3. The apparatus of claim 1 further comprising a third support rail having at least one anchor plate connectively attached wherein said third support rail is positioned under said bed frame between said left side and said right side providing support for said center support device.

4. The apparatus of claim 1 further comprising a second support frame comprising at least one vertical support member connectively attached at a right angle to at least one horizontal support member wherein said second support frame is connectively attached lengthwise to said center support device enabling extension of said bed frame.

5. The apparatus of claim 1 wherein said first collapsible extension device and said second collapsible extension device are both a length at least capable of a length doubling when extended.

6. The apparatus of claim 1 wherein said first collapsible extension device and said second collapsible extension device are both a length at least capable of length tripling when extended.

7. The bed transformer apparatus of claim 1 wherein said bottom tray platform further comprises a first tri-folding tray and said top tray platform further comprises a second tri-folding tray.

8. The apparatus of claim 1 further comprising a mattress.

9. A bed transformer apparatus for a slide out bed comprising a bed frame having a left side opposing a right side, a first collapsible extension device operationally attached to said left side, a second collapsible extension device operationally attached to said right side, a center support device comprising an extending rail having a bed support rail contained therein positioned at a midpoint between said left side and said right side, a first support rail having at least one anchor plate connectively attached wherein said first support rail is connectively attached lengthwise to said first collapsible extension device enabling extension of said bed frame, a first support frame comprising at least one vertical support member connectively attached at a right angle to at least one horizontal support member wherein said first support frame is connectively attached lengthwise to said second collapsible extension device enabling extension of said bed frame, and a lengthwise tri-folding bed tray comprising a bottom tray platform, a middle tray platform, and a top tray platform unfold-able to fill said bed frame.

10. The bed transformer apparatus of claim further 9 wherein said first support frame is disconnected from said second collapsible extension device and positioned to support said midpoint and said bed transformer further comprises a second support rail having at least one anchor plate connectively attached wherein said second support rail is positioned under said bed frame along said right side connectively attached to and providing support for said second collapsible extension device enabling extension of said bed frame.

11. The apparatus of claim 9 further comprising a third support rail having at least one anchor plate connectively attached wherein said third support rail is positioned under said bed frame between said left side and said right side providing support for said center support device.

12. The apparatus of claim 9 further comprising a second support frame comprising at least one vertical support member connectively attached at a right angle to at least one horizontal support member wherein said second support frame is connectively attached lengthwise to said center support device enabling extension of said bed frame.

13. The apparatus of claim 9 wherein said first collapsible extension device and said second collapsible extension device are both a length at least capable of length tripling when extended.

14. The apparatus of claim 9 further comprising a mattress.

* * * * *